United States Patent [19]

Takeuchi

[11] Patent Number: 5,458,016
[45] Date of Patent: Oct. 17, 1995

[54] BALL THREAD

[75] Inventor: Mitsuo Takeuchi, Iwaki, Japan

[73] Assignee: Takeuchi Precision Works Co., Ltd., Fukushima, Japan

[21] Appl. No.: 160,792

[22] Filed: Dec. 3, 1993

[30] Foreign Application Priority Data

Apr. 23, 1993 [JP] Japan .................................. 5-097451

[51] Int. Cl.⁶ ............................. F16H 25/24; F16H 55/17
[52] U.S. Cl. ...................... 74/459; 74/89.15; 74/424.8 R
[58] Field of Search ........................... 74/89.15, 424.8 R, 74/459; 285/264, 405; 384/208, 906

[56] References Cited

U.S. PATENT DOCUMENTS

| | | | |
|---|---|---|---|
| 1,021,924 | 4/1912 | Fetzer | 285/264 |
| 2,455,166 | 11/1948 | Firth | 384/906 |
| 4,660,431 | 4/1987 | Heine | 74/89.15 |
| 5,230,567 | 7/1993 | Takeuchi | 384/43 |

Primary Examiner—Richard M. Lorence
Assistant Examiner—Chong H. Kim
Attorney, Agent, or Firm—Antonelli, Terry, Stout & Kraus

[57] ABSTRACT

A ball thread has a threaded shaft, a nut fitted over the threaded shaft with internal and external threads fitted in the same position, balls inserted into a groove formed with a combination of the threads of the threaded shaft and the nut, a return groove fitted to the nut in order to make the balls movable therethrough, and a flange for fixing the nut to machinery, apparatus or the like. A spherical collar centered around the axis of the threaded shaft is fitted to one end of the nut and the flange has a space having a spherical inner wall coaxial with the collar held in the space, the flange being allowed to swivel with respect to the threaded shaft. The ball thread further includes a means for fixing the nut to the flange in a given position and a means for preventing the nut from revolving with respect to the flange. The ball thread having the flange can be fitted to machinery, apparatus or the like, irrespective of its flange-fitting surface condition. The ball thread, whose nut is fixed to the flange, can be driven with accuracy while it remains unaffected by the rotation of the threaded shaft. The work of fitting the ball thread having the flange to machinery, apparatus or the like can be done simply, precisely and efficiently.

2 Claims, 5 Drawing Sheets

BALL THREAD

BACKGROUND OF THE INVENTION

The present invention relates generally to ball threads, and more particularly to a ball thread having a flange for fitting to machinery, apparatus or the like.

Since ball threads are less frictional and highly efficient, they are employed in various measuring instruments, medical appliances, computer terminals and the like, to say nothing of industrial robots.

FIG. 8 is a sectional view of the principal part of a ball thread heretofore in use. The ball thread comprises a threaded shaft 1, a nut 2 fitted over the threaded shaft 1 with the internal and external threads of the respective parts aligned in the same position, balls 3 inserted into the groove formed by a combination of the threads in the threaded shaft 1 and the nut 2, and a return groove 4 fitted to the nut 2 so that the balls 3 are made movable therethrough. At one end of the nut 2 is a flange 5 having a flange face 5a perpendicular to the axis of the threaded shaft 1 and bolt holes for use in fitting the ball thread to machinery, apparatus or the like 6 (portions where the ball thread is fitted to machinery or apparatus), whereby the flange 5 can be fitted to machinery, apparatus or the like 6 by means of fixing screws 7.

The aforesaid ball thread with the flange is constructed such that, when an apparatus 6, for example, is moved along the threaded shaft 1 while both ends thereof are fixed, the nut 2 screwed onto the threaded shaft 1 and secured to the apparatus 6 by means of the flange 5 causes the apparatus 6 to be revolved as it moves along the threaded shaft 1.

Conversely, with the ball thread fitted to the apparatus 6 via the flange 5 and with the revolution of the apparatus 6 kept under control it is possible to move the apparatus 6 in the axial direction of the shaft when the threaded shaft 1 is rotated by a motor.

Unlike a ball thread without a flange, the ball thread having the flange is capable of simplifying and quickening the work of fitting the ball thread to the apparatus. However, it is not always easy to align the threaded shaft perpendicularly to the fitting surface of the flange for keeping the apparatus in proper position. When the flange is fitted to the apparatus, however, mill scales will have to be removed therefrom to smooth the surface, if the apparatus is carrying such mill scales because it has not yet been subjected to surface finish. When the mill scales are not removed, a shim is put between the flange-fitting surface of the apparatus and the flange to secure the perpendicularity of the threaded shaft to the former.

Particularly when the apparatus is fitted via the flange to the threaded shaft of the ball thread at an angle with the latter, the fitting work will take much time and less accurate will typically resulting arrangement.

Such fitting work requires more manhours and, as it includes operations performed by trial and error, improvements to increase the accuracy and efficiency of such fitting are still desired.

Regarding a similar problem arising from fitting a linear ball bearing to machinery, apparatus or the like, the present applicant discloses a technique of making the ball bearing unit movable, particularly making it capable of swiveling with respect to a flange unit (U.S. Pat. No. 5,230,567) so as to solve the problems as stated above. However, only making the ball bearing unit of such a ball thread movable with respect to the flange still falls short of accomplishing the intended purpose because the nut is moved back and forth by utilizing the rotation of the threaded shaft.

SUMMARY OF THE INVENTION

It is therefore a general object of the present invention to provide a ball thread having a flange arranged so that the ball thread can be fitted satisfactorily to machinery, apparatus or the like, irrespective of its fitting surface condition.

It is another object of the present invention to provide a ball thread whose nut fixed to a flange can be driven with accuracy while it remains unaffected by the rotation of a threaded shaft.

It is still another object of the present invention to provide a ball thread having a flange, the ball thread being designed to be fitted to machinery, apparatus or the like simply, precisely and efficiently.

In order to accomplish the foregoing objects, a ball thread according to the invention comprises a threaded shaft, a nut fitted over the threaded shaft with internal and external threads fitted in the same position, balls inserted into a groove formed by a combination of the threads in the threaded shaft and the nut, a return groove fitted to the nut in order to allow the balls to be movable therethrough, and a flange for fixing the nut to machinery, apparatus or the like, the flange being allowed to swivel with respect to the nut. The ball thread also includes a means for fixing the nut to the flange in a given position and a means for preventing the nut from revolving with respect to the flange.

A ball thread according to the invention also comprises a threaded shaft, a nut fitted over the threaded shaft with internal and external threads fitted in the same position, balls inserted into a groove formed by a combination of the threads of the threaded shaft and the nut, a return groove fitted to the nut in order to allow the balls to be movable therethrough, and a flange for fixing the nut to machinery, apparatus or the like. A spherical collar centered around the axis of the threaded shaft is fitted to one end of the nut and the flange has a space having a spherical inner wall coaxial with the collar, which is held in the space, so that the flange is allowed to swivel with respect to the threaded nut. The ball thread also includes a means for fixing the nut to the flange in a given position and a means for preventing the nut from revolving with respect to the flange.

There is provided at least one means for preventing the nut from revolving with respect to the flange, the means comprising a V-shaped groove provided in the nut in the direction the axis of the threaded shaft on the spherical surface of the collar, and a means for pressing steel balls held in a guide hole of the flange against the V-shaped groove; or there are otherwise provided at least two of the means for preventing the nut from revolving with respect to the flange, the means comprising a worm helical gear provided on the spherical surface of the collar, and a screw meshing with the worm helical gear provided on the flange. As a means for fixing the nut to the flange, use can be made of a lock nut, for example.

With the arrangement described above, including the spherical collar fitted to one end of the nut and the flange having a space with a spherical inner wall coaxial with the collar, the flange being allowed to swivel with respect to the nut, the threaded shaft held by the nut may be tilted as desired with respect to the apparatus-fitting surface of the flange, for example. As a result, the nut can be fitted to the apparatus simply, precisely and efficiently. The ball thread, which is used to convert the rotation of the threaded shaft into the forward and backward movements of the flange, that is, the movements of apparatus, is provided with the means for preventing the nut from revolving with respect to the flange, including the V-shaped groove provided along the axis of the threaded shaft and on the spherical surface of the collar, and the means for pressing steel balls held in the guide hole in the flange against the V-shaped groove, or otherwise means including the worm helical gear provided on the spherical surface of the collar, and the screw meshing with the worm helical gear provided on the flange. Therefore, the threaded shaft is surely prevented from rotating with respect to the flange even though it is rotated in such a state that its inclination against the flange has been adjusted while the nut has been fixed to the flange with a nut fixing means. The ball thread can thus be positioned with respect to the apparatus precisely and efficiently.

BRIEF DESCRIPTION OF THE DRAWINGS

The present invention will be understood by reference to the following detailed description and the accompanying drawings wherein,:

FIG. 4 is a diagram illustrating the ball thread fitted to machinery, apparatus or the like.

DESCRIPTION OF THE PREFERRED EMBODIMENTS

The embodiments of the present invention will now be described.

Figure 1:
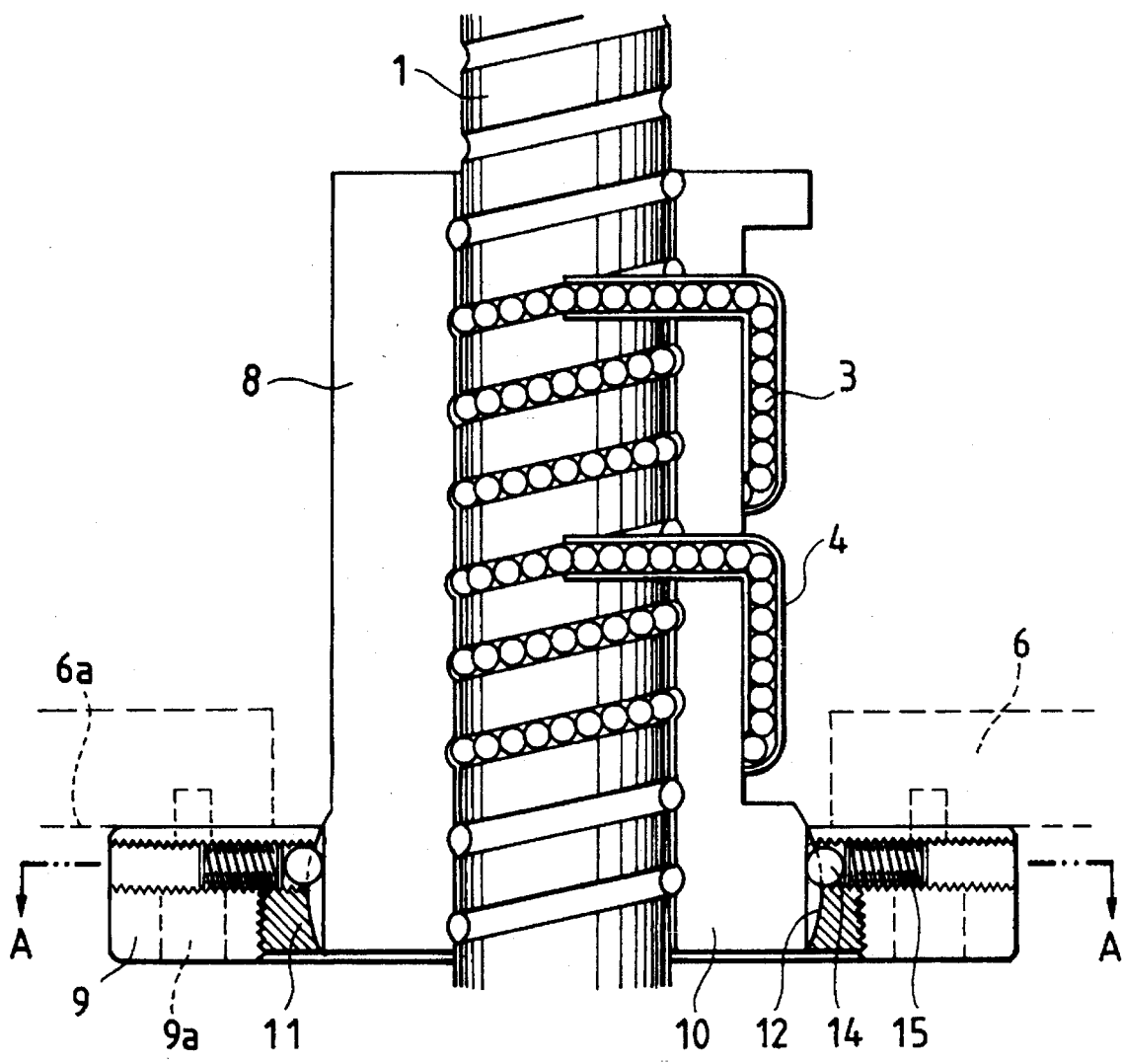
FIG. 1 is a sectional view of a ball thread embodying the present invention.
Figure 2:
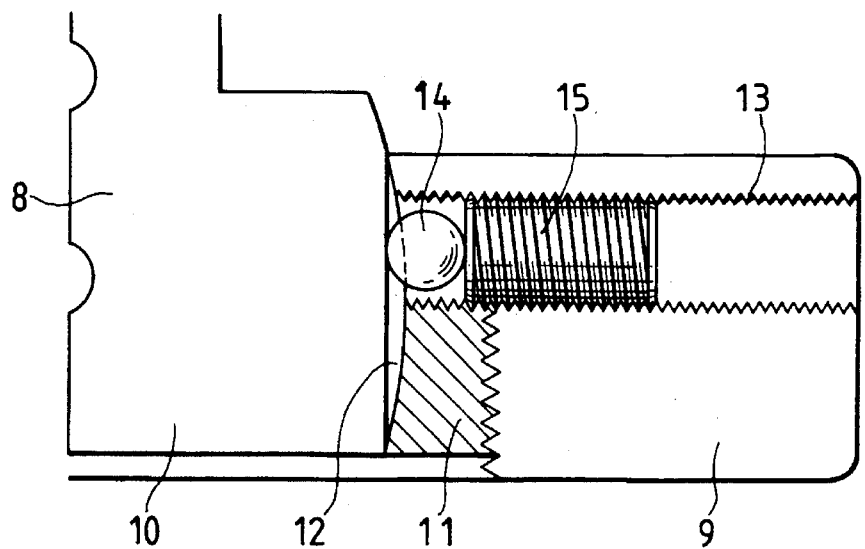
FIG. 2 is a sectional view of the enlarged principal part of FIG. 1.
Figure 8:
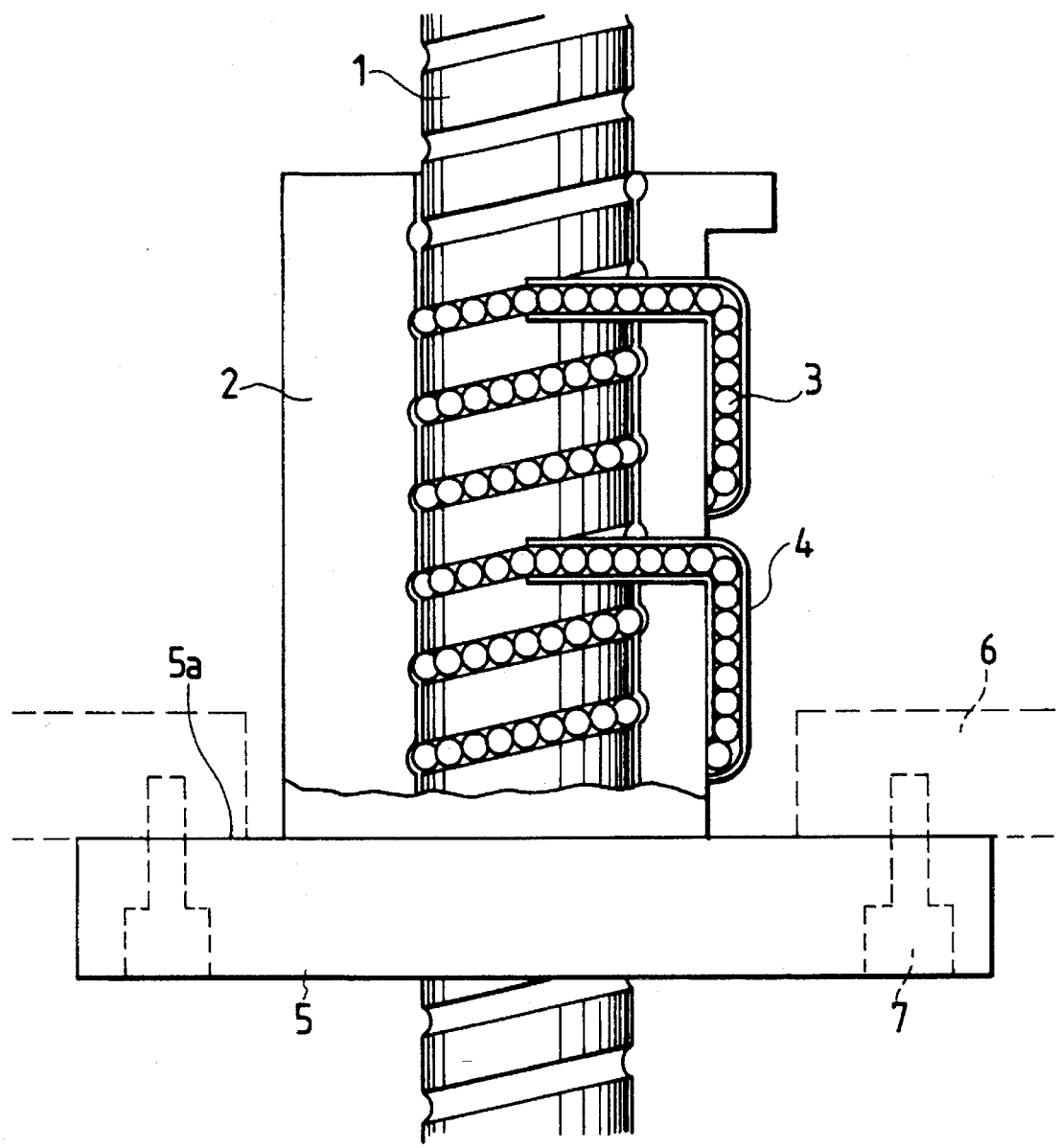
FIG. 8 is a diagram illustrating a conventional ball thread.

FIG. 1 is a sectional view of a ball thread embodying the present invention; FIG. 2 a sectional view of the enlarged principal part of FIG. 1; and FIG. 3 a sectional view taken on line A—A of FIG. 1, wherein like reference characters designate like and corresponding parts of FIG. 8, whereas numerals 8, 9 denote a nut and a flange of the ball thread according to the present invention, and 10 a spherical collar which is provided at one end of the nut 8 and is coaxial with a threaded shaft 1. The flange 9 is formed separately from the nut 8 and has a space in its central portion and bolt holes 9a for use in fitting the flange to machinery, apparatus or the like 6, the space having an annular inner wall coaxial with the collar 10. One part of the flange 9 in the thickness direction of its inner peripheral surface is concave, whereas the other part forms a space for accommodating a lock (clamp) nut 11. Numeral 12 denotes a V-shaped groove provided in the collar 10 in the direction of the threaded shaft 1, and 13 a guide hole bored in the radial direction of the flange 9 so as to contain steel balls 14. When the steel balls 14 are pressed by a screw 15 against the V-shaped groove 12, they prevent the collar 10 from revolving with respect to the flange 9.

As the flange 9 is allowed to swivel with respect to the collar 10 of the nut 8 when the nut 8 is held by the threaded shaft 1, an inclination of the threaded shaft 1 against the flange 9 may be selected optionally within the range of −2° to 2°.

No special consideration is required for the flange-fitting surface condition 6a of the machinery, apparatus or the like (hereinafter simply referred to as "apparatus") 6 when the ball thread is fitted thereto perpendicularly. As it is possible to freely adjust the angle at which the threaded shaft 1 is fitted to the apparatus 6 after the flange 9 is fitted thereto, the ball thread can be fitted to any desired position simply, easily, precisely and efficiently. Therefore, the processing of the flange-fitting surface or the adjustment of the flange-fitting angle of the apparatus that has heretofore been required can be dispensed with.

Although the sole means for preventing the nut 8 from revolving with respect to the flange 9, comprising a combination of the collar 10 with the means for pressing the steel balls 14, including the balls 14, is capable of accomplishing the purpose, the provision of a plurality of such means may ensure the more positive achievement of the intended effect.

Figure 3:
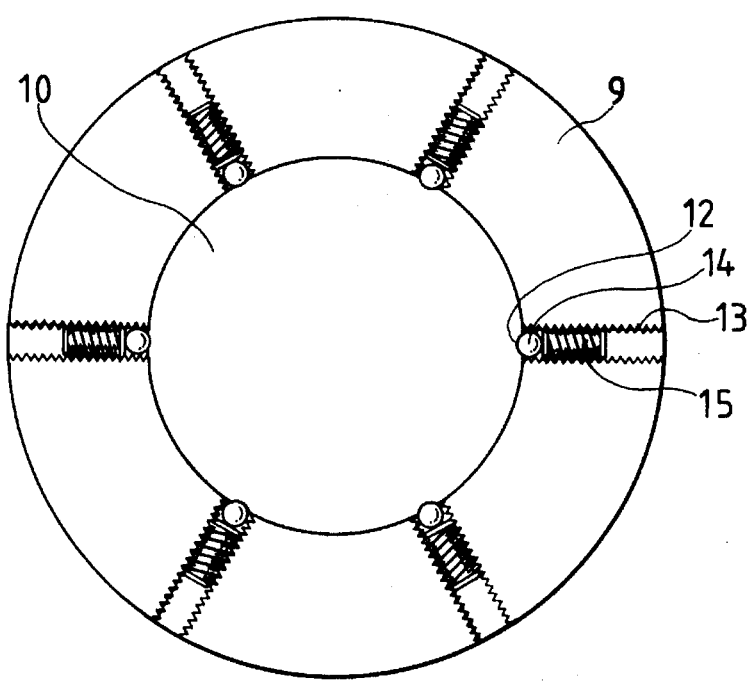
FIG. 3 is a sectional view taken on line A—A of FIG. 1.
Figure 4:
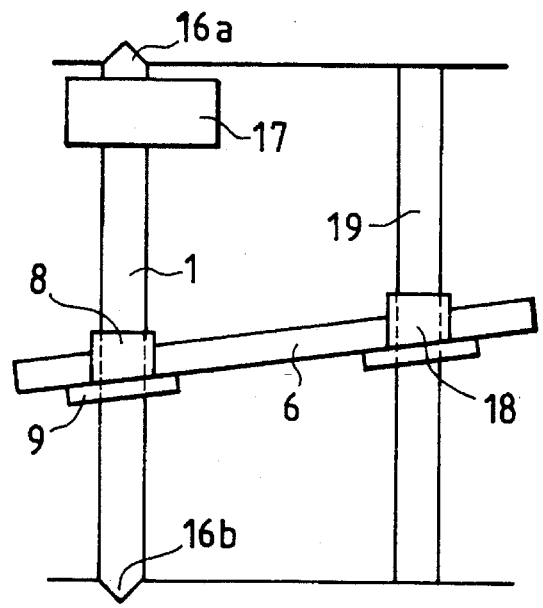

FIG. 4 is a diagram illustrating the ball thread in operating condition, wherein like reference characters designate like and corresponding parts shown in FIGS. 1 to 3. In FIG. 4, numerals 16a, 16b denote supports on both ends of the threaded shaft 1, 17 a means for rotating the threaded shaft 1, and 18 a linear motion ball bearing for guiding the apparatus 6 moved by the ball thread along a shaft 19, the bearing being fixed to the apparatus 6. When any conventional ball thread having a flange is used, the ball thread can not be readily assembled into machinery, apparatus or the like in positional relation thereto; however, the ball thread according to the present invention can be fitted therein simply and precisely.

Figure 5:
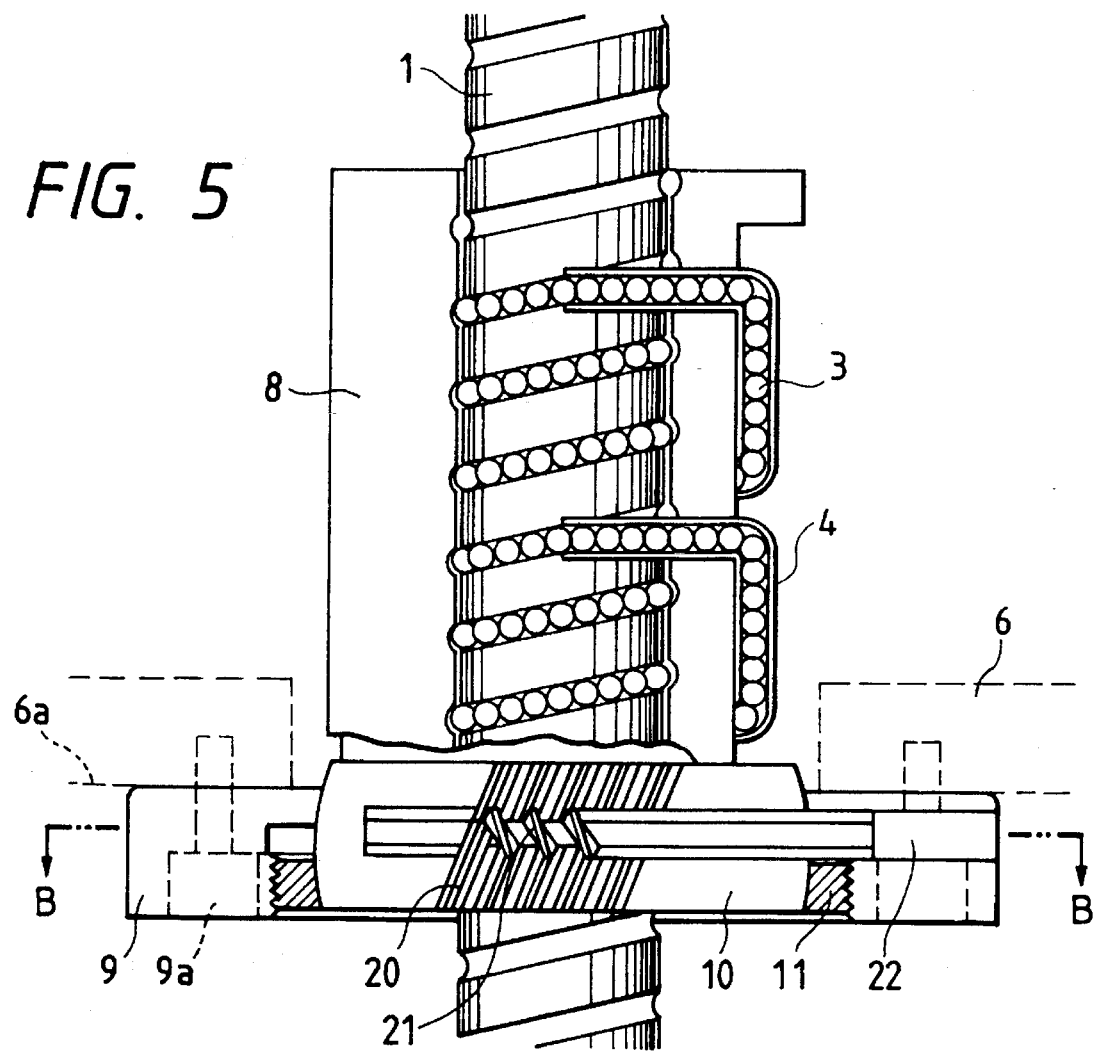
FIG. 5 is a sectional view of another ball thread embodying the present invention.
Figure 6:
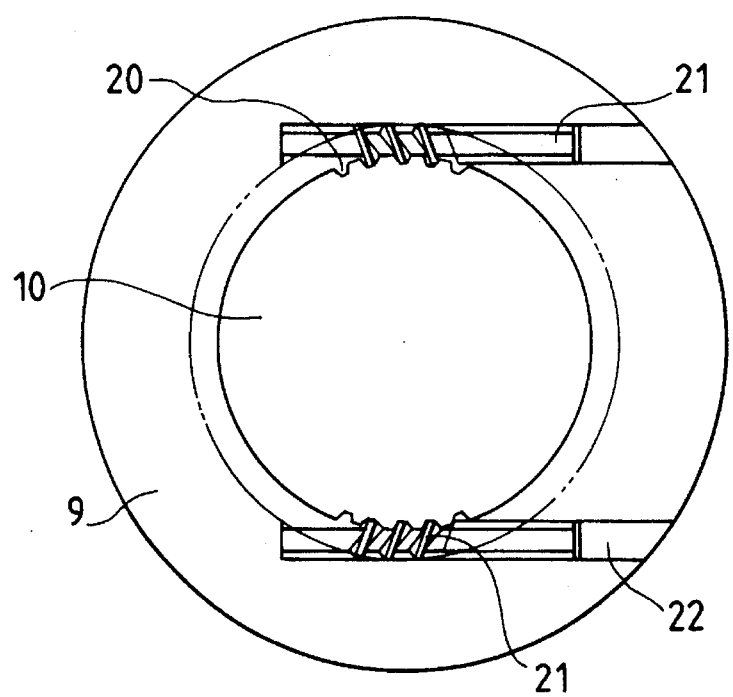
FIG. 6 a sectional view taken on line B—B of FIG. 5.
Figure 7:
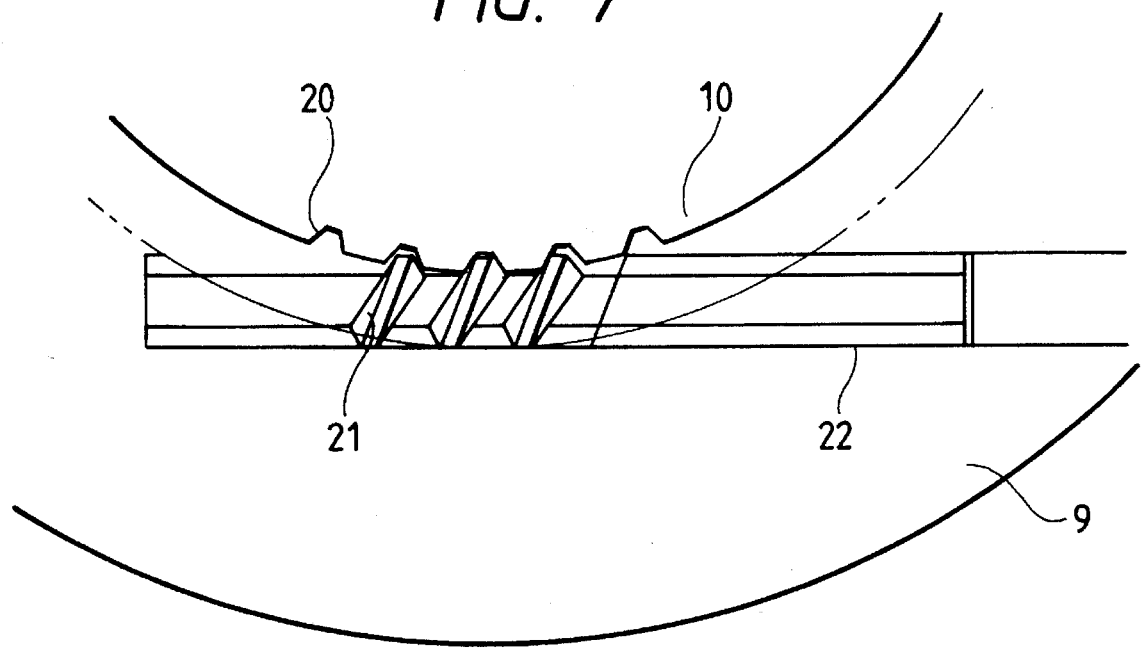
FIG. 7 is a sectional view of the enlarged principal part of FIG. 6.

FIG. 5 is a sectional view of another embodiment of the present invention and FIG. 6 is a sectional view taken on line B—B of FIG. 5 and FIG. 7 is a sectional view of the enlarged principal part of FIG. 6. What makes this embodiment different from what is shown in FIGS. 1 to 3 is that a means having different construction is used for preventing the nut 8 from revolving with respect to the flange 9. In FIGS. 5 to 7, like reference characters designate like and corresponding parts of FIGS. 1 to 3, whereas numeral 20 denotes a worm helical gear cut in the spherical surface of the collar 10, and 21 denotes a screw provided in a guide hole 22 bored in the flange 9.

Since the screw 21 is caused to mesh with the worm helical gear 20 of the collar 10 only by fixing the screw 21 in the guide hole 22 bored in the flange 9 according to the present embodiment, the collar 10, that is, the nut 8 is prevented from revolving with the respect to the flange 9.

According to the present embodiment, the worm helical gear 20 as the means for preventing the nut 8 from revolving with respect to the flange 9 is kept free from meshing with the screw 21 of the flange 9 first and then a lock nut 11 is tightened to combine the nut 8 with the flange 9 after the angle of the nut 8 with the flange 9 is adjusted as in the case of the embodiment shown in FIGS. 1 to 3. Subsequently, the screw 21 is fixed in the guide hole 22 of the flange 9. The worm helical gear 20 meshing with the screw 21 can thus prevent the nut 8 from revolving with respect to the flange 9.

Although a pair of exemplary means comprising the worm helical gear 20 provided on the collar 10 of the nut 8 and the screw 21 of the flange 9 are used to prevent the nut 8 from revolving with respect to the flange 9 according to the present invention, more than two means may be fitted therein. The worm helical gear 20 fitted to the collar 10 may be provided in only a desired portion or along the whole periphery of the collar 10.

Since the ball thread according to the embodiments shown is arranged so that the threaded shaft 1 makes contact with the nut 8 via the rolling steel balls 3, the mechanical efficiency reaches 90% or greater and in comparison with a slide contact feed screw, the torque required is reduced to ⅓ or less. Therefore, accuracy can be increased greatly by ultra-precision machining and this makes accurate positioning possible. As the ball thread is a roll contact kinematic mechanism produced through careful material selection together with heat treatment, frictional wear with use becomes almost negligible to ensure high performance for a long period of time.

With the introduction of a marked technological innovation, ball threads can be utilized effectively for the improvement of machining precision and productivity involving the development of accurate positioning methods and energy-saving so as to deal with the ultra-precision machining called for in the machine industry.

More specifically, the nut fitted with the threaded shaft is allowed to swivel with respect to the flange fitted to the apparatus. When the threaded shaft having a flange according to the embodiments shown is fitted to the apparatus, that is, particularly when the flange is fitted thereto even at angles therewith, the ball thread can be fitted simply, easily, precisely and efficiently.

The threaded shaft having the flange, which is fitted to machinery, apparatus or the like precisely and efficiently, can be effectively to applicable to various industrial uses.

What is claimed is:

1. A ball thread comprising:

a threaded shaft, a nut fitted over the threaded shaft with internal and external threads aligned in the same position, balls inserted into a groove formed by a combination of the threads of the threaded shaft and the nut, a return groove fitted to the nut in order to allow the balls to be movable therethrough, and a flange for fixing the nut to a structure, wherein a spherical collar is provided at one end of the nut, the flange has an internal space having a spherical inner wall coaxial with the collar which is held in said space so that the flange is allowed to swivel with respect to the nut, the ball thread further includes means for fixing the nut to the flange in a given position, and means for preventing the nut from revolving with respect to the flange, and wherein the means for preventing the nut from revolving with respect to the flange comprises a worm helical gear provided on a surface of the nut, and a screw meshing with the worm helical gear provided on the flange.

2. A ball thread as claimed in claim 1, including at least two of said means for preventing the nut from revolving with respect to the flange, each including the worm helical gear and the screw in combination.

\* \* \* \* \*